Nov. 5, 1968    G. K. RIEL    3,409,771
SYSTEM FOR MEASURING RADIOACTIVE ISOTOPES IN DILUTE SOLUTION
Filed Nov. 3, 1966
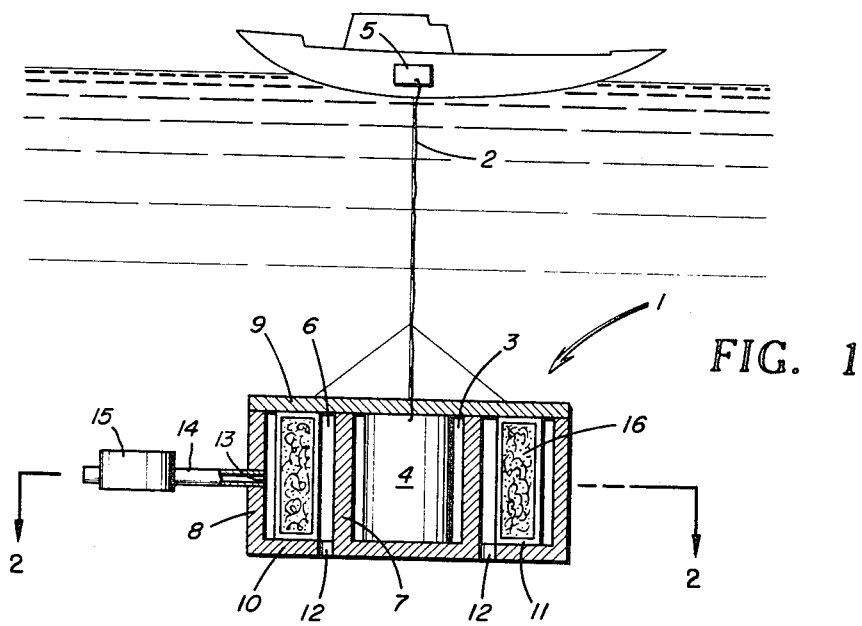
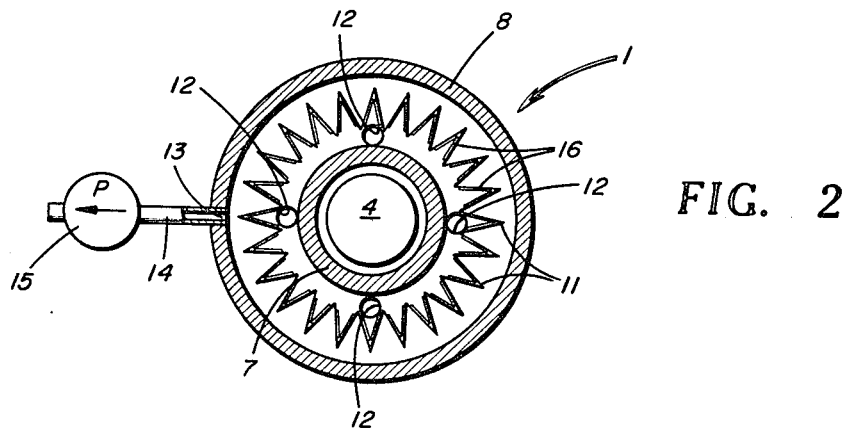
INVENTOR
Gordon K. Riel

United States Patent Office 3,409,771
Patented Nov. 5, 1968

3,409,771
SYSTEM FOR MEASURING RADIOACTIVE
ISOTOPES IN DILUTE SOLUTION
Gordon K. Riel, Silver Spring, Md., assignor to the United States of America as represented by the Secretary of the Navy
Filed Nov. 3, 1966, Ser. No. 591,934
3 Claims. (Cl. 250—83)

ABSTRACT OF THE DISCLOSURE

An apparatus for measuring radioactive isotopes in very dilute solutions where the solution is pumped through a porous filter supporting a loosely packed, radioactive isotope extracting resin. A detector positioned adjacent the filter measures the radioactive isotopes trapped by the resin.

---

The invention described herein may be manufactured and used by or for the Government of the United States of America for governmental purposes without the payment of any royalties thereon or therefor.

This invention relates generally to radioactive detection and more particularly to a method and apparatus for measuring radioactive isotopes in very dilute solutions.

The fastest known method of determining the presence of radioactive isotopes in liquids is by the measurement of their gamma spectrum. It has been found, however, that at concentrations below $10^{-12}$ curies per liter, this method is not satisfactory. Present day measuring methods such as the sampling program for cesium 137 and other determinations of trace radioactivity generally use indirect counting procedures such as sample collection and chemical separation processes before counting. These processes require the collection of large quantities of water which cause problems in the collection of the samples as well as in the storage thereof. Furthermore, when the collected samples are raised to the water surface, contamination by atmospheric Cs 137 is present. The lengthy chemical procedure required for separation and counting after the samples have been collected often delays results for up to six months.

Radioactive sampling tests of the deepest parts of the ocean by indirect sampling methods have indicated wide variations in the concentration of cesium 137 amounting to several megacuries of cesium 137. In addition, there is little prospect at this time that it will ever be feasible to chemically process enough ocean samples to meaningfully chart the variations in radioactivity presently reported throughout the deep ocean. A direct method of counting the radioactivity deep in the ocean would save many hours on every test and would resolve and measure low concentrations of radioactivity where the conventional indirect methods are ineffective.

The underwater gamma spectrometers previously used in making direct measurements are only capable of measuring isotopes which are present in picocurie per liter concentrations. To apply these devices to the measurement of the gamma spectrum of more solutions, resin has been packed in columns through which a flow of only a few drops per minute of collected seawater samples can pass thereby prolonging the measurement process.

An object of the present invention is the provision of a faster and more reliable method and apparatus for the determination of the presence of radioactive isotopes in dilute concentrations.

Another object is to provide a radioactive detector which is economical in operation and gives an immediate and direct indication of the measurement results.

Briefly, in accordance with one aspect of the invention, the foregoing and other objects are attained by providing an underwater spectrometer with a pump to effect a high water flow rate through a resin capable of extracting radioactive isotopes and supported by a porous filter having a large surface area to enable the large quantities of water to flow through the porous filter and loosely packed resin.

A more complete appreciation of the invention and many of the attendant advantages thereof will be readily seen as the same becomes better understood by reference to the following description when considered in connection with the accompanying drawing wherein:

FIG. 1 shows, partially in cross-section, a preferred embodiment of the detection apparatus of this invention; and FIG. 2 shows a cross-section of the invention taken along line 2—2 of FIG. 1.

As shown, the apparatus is formed of a housing 1, preferably made of steel, suspended from a ship by a cable 2 at great depths, such for example, as 3000 meters in the sea. The housing 1 contains a central cylindrically-shaped watertight chamber 3 in which a probe or detector 4 is suspended. A spectrometer or other conventional counting equipment 5 may be located in the ship or any other convenient location. An annular compartment 6, formed by steel walls 7, 8, 9 and 10, surrounds the central chamber 3 and is separated therefrom by wall 7. A filter 11 is sealingly held between upper and lower walls 9 and 10 of annular compartment 6. Inlets 12 formed in the bottom wall 10 of the annular compartment 6 allows water from the surrounding sea to be drawn through the filter 11, an outlet 13 and a pipe 14 by a suction pump 15 which may be mounted at any convenient distance from the housing 1. A suction pump is used so that the sea water will not be contaminated before going through the filter. A resin 16, such as ammonium phosphomolybdate or one of the ferrocyanides or the like, capable of extracting cesium 137 from seat water is spread over the large surface area of the inside or inlet side of the filter, near the detector 4, so that any radioactive isotopes contained in the pumped sea water may be extracted by the resin, sensed by the detector 4 and counted by the spectrometer 5. The large surface area of the filter 11, over which the resin is spread, allows large quantities of water, such for example as up to 1000 liters per minute to be pumped therethrough. In addition, the large quantities of water passing through the large area of resin allows very low concentrations of isotopes to be extracted from the sea water and accurately measured. Best results are obtained by using a filter which contains an asbestos liner. A few hundred grams of resin can then be spread over the filter without packing down the filter and encountering the problem of trying to pump large quantities of seat water through the dense, clay-like resin.

The use of the suction pump 16 instead of natural circulation causes extraction of the isotopes to take place at a known rate. Furthermore, by using a pump the extraction process is speeded up and immediate measurements may be taken instead of waiting until the resin can be examined in a laboratory.

This method will give immediate knowledge of the results while the probe or detector is at great depths and allow repeated measurements without the necessity of repetitious raising and lowering of the probe. In addition, the problems of contamination by atmospheric cesium 137 encountered in the previously used sample collection techniques will be solved by in situ counting. This direct counting method will also make it possible to verify any indications of unusual activity.

The extraction system of this invention operates at ambient pressure and may be used at any depth which can be reached by ship-supported cables. Any of the presently available ships used for underwater operations may be used with the equipment of this invention.

As stated previously, by using the asbestos loaded filter up to 1000 liters per hour of sea water may be pumped through the dense clay-like resin. AMP-1 resin has been used because its distribution coefficient favors the extraction of cesium. This resin has a capacity of 1.2 milliequivalents of cesium per gram at a pH of +4 so that 1 gram of resin can hold 0.164 gram of cesium. Therefore, since 1000 liters of sea water normally contains approximately 2 milligrams of cesium, approximately 12 milligrams of resin will extract all the cesium without approaching saturation. However, because of the presence of the other ions, about 100 grams of resin are required per 1000 liters of sea water. If the activity of the sea water is around 0.5 d.p.m. per 100 liters, 1000 liters of sea water must be processed to detect cesium 137 in a one hour count. By using several small filters, or one in parallel around the probe or one large filter, as shown, 1000 grams of resin can be held so that up to 10 tests can be completed before raising the probe from the water. When the cesium 137 activity is higher in the water, shorter pumping times can be used and more tests can be made without changing the resin. After the resin reaches its saturation level the resin should be replaced and new tests can be taken.

In another embodiment of this invention (not shown) a resin impregnated filter may be placed in side-by-side relationship with the probe and sea water pumped therethrough by a suction pump in a manner similar to that used in pumping oil through the oil filter in an automobile.

Obviously many modifications and variations of the present invention are possible in the light of the above teachings. It is therefore to be understood that within the scope of the appended claims, the invention may be practiced otherwise than as specifically described.

What is claimed is:

1. An apparatus for measuring the level of radioactivity in a fluid medium comprising:
   porous filter means having a large surface area for allowing large quantities of fluid to flow therethrough;
   a radioactive isotope extracting resin spread over said large surface area of said porous filter means;
   pump means associated with said filter means for pumping large volumes of fluid through said resin and said filter means at a known rate;
   and detector means surrounded by said filter means for sensing and counting the radioactive isotopes extracted by said resin.

2. An apparatus for counting the level of radioactivity in a liquid medium comprising:
   a housing;
   said housing having a watertight compartment;
   an annular chamber formed around said compartment;
   a porous filter having a large surface area, said filter mounted in said annular chamber;
   a resin supported on said filter through which large volumes of liquid may flow to extract radioactive isotopes therefrom;
   and radiation detector means mounted in said compartment for sensing the radioactive isotopes extracted by said resin.

3. The apparatus as defined in claim 2 wherein a pump is connected to said annular chamber to pump large volumes of liquid through said resin and said filter at a known rate.

References Cited

UNITED STATES PATENTS

| | | | |
|---|---|---|---|
| 2,985,758 | 5/1961 | Bosch | 250—83.3 |
| 3,151,931 | 10/1964 | Small | 23—338 |
| 3,316,066 | 4/1967 | Smit | 23—338 |

RICHARD A. FARLEY, *Primary Examiner.*

C. E. WANDS, *Assistant Examiner.*